United States Patent [19]

Desjardins et al.

[11] Patent Number: 5,789,003
[45] Date of Patent: Aug. 4, 1998

[54] METHOD FOR PREPARING A FLAVORING BASE

[75] Inventors: Jean-Jacques Desjardins, Denges; Philippe Duby, Prilly; Pierre Dupart, Winterthur; Robert Dustan Wood, Signy; Ulrich Zurcher, Yverdon, all of Switzerland

[73] Assignee: Nestec S.A., Vevey, Switzerland

[21] Appl. No.: 740,401

[22] Filed: Oct. 29, 1996

[30] Foreign Application Priority Data

Nov. 7, 1995 [EP] European Pat. Off. ............ 95810696

[51] Int. Cl.$^6$ ....................................................... A23L 1/22
[52] U.S. Cl. ............................. 426/49; 426/18; 426/48; 426/52; 426/534; 426/650
[58] Field of Search ............................. 426/44, 48, 49, 426/52, 534, 650, 18, 28, 533

[56] References Cited

U.S. PATENT DOCUMENTS 3,950,543  4/1976  Buffa et al. .................. 426/18
4,710,386  12/1987  Fulger et al. .................. 426/28

FOREIGN PATENT DOCUMENTS 06-237721  11/1994  Japan .
1 442 149  7/1976  United Kingdom .

OTHER PUBLICATIONS

87–10633 6 WPIDS, Abstracting JP 62055069 Mar. 1987.

77–83953 Y WPIDS, Abstracting JP 76–39061, Apr. 1976.

Sugiyama et al, Patent Abstracts of Japan, Abstracting 05–336907, Dec. 1993.

*Primary Examiner*—Leslie Wong
*Attorney, Agent, or Firm*—Pennie & Edmonds

[57] ABSTRACT

Method of preparing an flavoring base, in which a mixture is prepared combining at least water and a starchy starting material, the mixture is liquefied with at least one carbohydrase and it is treated enzymatically with a lipase or a lipoxygenase, and use of the the dried or liquid flavoring base for the manufacture of a food product.

13 Claims, No Drawings

METHOD FOR PREPARING A FLAVORING BASE

TECHNICAL FIELD

The subject of the present invention is a method of preparing a flavoring base, as well as its use for the manufacture of food products.

BACKGROUND ART

The use of flavorings or coating syrups to strengthen the cooked-grain taste and/or the biscuity taste and/or the toasted taste has been known for a long time in the preparation of food products, in particular in the manufacture of breakfast cereals and desserts. However, these flavorings or these syrups often do not make it possible to reproduce the basic characteristic taste of these food products obtained by a traditional methods.

CA 2,004,149 describes in particular a method of preparing cooked breakfast cereals, in which a mixture based on a starchy starting material having a water content of 14–22% by weight is prepared and is then extrusion-cooked. The extrusion-cooked and puffed product thus obtained may then be dried, and next ground and agglomerated so as to obtain granules which may readily be dissolved in a liquid.

According to EP 0,606,505, another known method of preparing breakfast cereals consists in preparing a composition comprising in particular a starchy starting material and sugar and in extrusion-cooking this composition with a suitable amount of water so as to obtain puffed cereals of the required density. These cereal pieces may then be coated with a syrup and dried.

However, although they have the advantage of being quick, such methods do not make it possible to obtain cooked cereals with a cooked-grain taste and/or with a biscuity taste and/or with a toasted taste since the cooking time, which is generally about a minute, is too short.

SUMMARY OF THE INVENTION

The object of the present invention is to propose a method of preparing an flavorings base with a cooked-grain taste and/or toasted taste and/or biscuity taste.

To this end, in the method of preparing an flavoring base according to the present invention:

- a mixture comprising at least water and a starchy starting material is prepared,
- the mixture is liquefied with at least one carbohydrase,
- it is then treated enzymatically with a lipase or a lipoxygenase.

It has been observed, surprisingly, that such a method, which has the advantage of being quick, makes it possible effectively to obtain an flavoring base with a cooked-grain taste and/or with a toasted taste and/or with a biscuity taste.

DETAILED DESCRIPTION OF THE PREFERRED EMBODIMENTS

In the following description, the expression "starchy starting material" will be employed to denote a cereal semolina or flour, in particular one from durum wheat, Triticum aestivum wheat, rice, barley or corn.

To carry out the present method, a mixture comprising at least water and a starchy starting material is prepared. A mixture comprising 50–70% water, 25–50% starchy starting material and about 0–5% vegetable oil may be prepared, for example.

The mixture is liquefied, so as to reduce its viscosity, with at least one carbohydrase. It may be liquefied with about 0.2–0.5% α-amylase, in particular with that marketed under the name Dexlo P by Gist-Brocades N. V., Food Ingredient division, P.B. 01, NL-260 MA DELFT at 50°–85° C. for about 70–90 min, for example. An α-amylase whose enzymatic activity is 170,000 Amylase Units per gram is preferably used. This enzymatic activity is measured on a starch modified by attaching a dye which, on becoming released, colors the solution, whose intensity becomes measurable.

The mixture is then treated enzymatically, preferably with a lipase or a lipoxygenase, so as to promote the formation of flavoring compounds which give a characteristic basic taste.

The mixture may be treated enzymatically with 0.5–1.5% lipoxygenase, in particular that extracted from garden pea meal marketed by Fluka A. G., Chemische Fabrik, CH-9470 BUCHS St GALL, at 40°–60° C. for 80–100 min, so as to oxidize the polyunsaturated fatty acids to hydroxyperoxides, which are unstable molecules, forming flavoring compounds, for example. A lipoxygenase whose enzymatic activity is 135,000 Lipoxygenase Units per gram is preferably used. This enzymatic activity is measured by measuring the oxidation of linoleic acid by the lipoxygenase under UV light.

The mixture may also be treated enzymatically with 0.05–0.2% lipase, in particular that marketed by Novo Ferment A. G., Neumatt, CH-4243 DITTINGEN, at 45°–65° C. for 110–130 min, so as to facilitate the oxidation of the fatty acids and the formation of flavoring compounds, on account of the hydrolysis of the lipids into fatty acids, for example. A lipase having an enzymatic activity of 184,000 Lipase Units per gram is preferably used. This enzymatic activity is measured by measuring the fluorescent intensity of a specific fraction associated with heptanoic acid.

In a first preferred embodiment of the present method, the mixture is dried after the enzymatic treatment and after an optional brief inactivation of the enzymes with steam, for example. It may, in particular, be dried on a cylinder. To do this, a film of liquid or pasty material to be dried is formed on at least one heated cylinder, and the dried film is detached from the cylinder and then reduced to flakes. The dried flavoring base thus prepared may be used directly for the manufacture of a food product or it may be packaged and stored for subsequent use, for example.

In a second preferred embodiment of the present method, the mixture is heat-treated at 90°–120° C. for 10–30 min after the enzymatic treatment step, so as to stabilize it and to inactivate the enzymes. A liquid flavoring base is thus obtained, which may be used directly for the manufacture of a food product, or which may be packaged and stored for subsequent use, for example.

The subject of the present invention is also the use of the flavoring base obtained according to the present method for the manufacture of a food product. It may be used, in particular, for the manufacture of instant desserts and soups, for example. Similarly, it may be used in a food composition intended for baby food, for example.

The flavoring base is preferably used for the manufacture of ready-to-eat cereals. To do this, the flavoring base is preferably incorporated into a composition comprising 8–15% water and, as % solids by weight, 70–90% starchy starting material, 2–20% sugar, 1–5% hydrogenated palm oil, 2–4% malt extract, 2–3% salt and 0–1% calcium carbonate, which may be extrusion-cooked at 150°–190° C. for 20–60 s for example. If the flavoring base is dried, it may be incorporated into the said composition at a proportion of 10–80% dried base per 20–90% composition.

On the other hand, if the flavoring base is liquid, it may be incorporated into the said composition at a proportion of 5–25% liquid base per 75–95% composition.

For the extrusion-cooking, a twin-screw extruder-cooker may be used, for example.

EXAMPLES

The method of preparing an flavoring base according to the present invention, and its use for the manufacture of food products, are described in greater detail in the non-limiting examples below. In these examples, the percentages and parts are given by weight on a basis, except where otherwise indicated.

EXAMPLE 1

A mixture comprising 700 g of cornflour and 1300 g of water is prepared and is liquefied with 0.3% α-amylase at 60° C. for 80 min.

The temperature is then lowered to 50° C. and the mixture is treated enzymatically with 1% lipoxygenase for 90 min.

The mixture is heat-treated with stirring for 20 min at 110° C. so as to inactivate the enzymes and to stabilize the mixture.

A liquid flavoring base with a cooked-grain taste and a toasted taste is thus obtained.

EXAMPLE 2

The method is performed as described in Example 1, except that the enzymatic treatment is carried out with 0.1% lipase at 55° C. for 100 min.

A liquid flavoring base with a cooked-grain taste and a biscuity taste is thus obtained.

EXAMPLE 3

A mixture comprising 49% corn semolina, 50% water and 1% corn oil is prepared. It is liquefied with 0.3% α-amylase at 70° C. for 90 min.

The temperature is then lowered to 50° C. and the mixture is treated enzymatically with 1% lipoxygenase for 90 min.

The enzymes are inactivated by injection of steam at 140° C. for 15 s. The mixture is then dried on a cylinder. To do this, the mixture is placed, in the form of a film, on a cylinder heated with saturated steam at 110 kPa and rotating at 4.2 rpm. The film is detached from the cylinder and is reduced to flakes.

A dried flavoring base with very pronounced toasted and biscuity tastes is thus obtained.

EXAMPLE 4

A mixture comprising 37.5% barley flour, 60.6% water and 1.9% corn oil is prepared. It is liquefied with 0.45% α-amylase at 85° C. for 60 min.

The temperature is then lowered to 45° C. and the mixture is treated enzymatically with 1.5% lipoxygenase for 60 min.

The enzymes are inactivated by injection of steam at 140° C. for 15 s. The mixture is then dried on a cylinder. To do this, the mixture is placed, in the form of a film, on a cylinder heated with saturated steam at 110 kPa and rotating at 4.2 rpm. The film is detached from the cylinder and is reduced to flakes.

A dried flavoring base with a taste of barley, with a biscuity taste and with a toasted taste is thus obtained.

EXAMPLE 5

The method is performed as described in Example 4, except that a mixture comprising 37.5% rice flour, 60.6% water and 1.9% corn oil is prepared.

A dried flavoring base with a cooked-grain taste and with a slightly biscuity taste is thus obtained.

EXAMPLE 6

The method is carried out as described in Example 4, except that a mixture comprising 37.5% wholewheat flour, 60.6% water and 1.9% corn oil is prepared.

A dried flavoring base with a cooked-grain taste and with a slightly biscuity taste is thus obtained.

EXAMPLE 7

The flavoring base as obtained in Example 1 is used for the manufacture of ready-to-eat cereals.

To do this, a composition is prepared comprising 10% water and, as % solids by weight, 86% corn semolina, 7.2% sugar, 2.8% malt extract, 1.7% salt, 1.8% hydrogenated palm oil and 0.5% calcium carbonate.

18% flavoring base, as % solids by weight, is incorporated into this composition during an extrusion-cooking operation, which is carried out in a twin-screw extruder-cooker at 165° C. for 40 s.

Ready-to-eat cereals which have a cooked-grain taste and a toasted taste are thus obtained.

EXAMPLE 8

The flavoring base as obtained in Example 2 is used and the method is carried out as described in Example 7, for the manufacture of ready-to-eat cereals.

Ready-to-eat cereals having a cooked-grain taste and a biscuity taste are thus obtained.

EXAMPLE 9

The flavoring base as obtained in Example 3 is used and the method is carried out as described in Example 7, except that 25% of the flavoring base is incorporated into the composition during the extrusion-cooking, for the manufacture of ready-to-eat cereals.

Ready-to-eat cereals having a cooked-grain taste and a toasted taste are thus obtained.

EXAMPLE 10

The flavoring base as obtained in Example 4 is used and the method is carried out as described in Example 7, except that 25% of the flavoring base is incorporated into the composition during the extrusion-cooking, for the manufacture of ready-to-eat cereals.

Ready-to-eat cereals having a biscuity taste and a toasted taste are thus obtained.

EXAMPLE 11

The flavoring base as obtained in Example 3 is used for the manufacture of a poultry soup.

To do this, a mixture is prepared comprising 0.01 part antioxidants, 1 part salt, 6 parts hydrogenated palm oil, 2 parts chicken fat, 2.5 parts chicken flavoring, 2 parts dehydrated chicken meat, 25.8 parts maltodextrin, 1 part mono sodiumglutamate so as to strengthen the taste, and 2.6 parts flavoring substances, in particular celery, pepper, onion and garlic.

57 parts dried flavoring base are incorporated into this mixture.

A powdered poultry soup is thus obtained, which the consumer can reconstitute while hot by mixing 25% of the said powder with 75% water at 90° C., so as to obtain a creamy poultry soup.

EXAMPLE 12

The flavoring bases as obtained in Examples 3, 4, 5 and 6 are used for the preparation of a dessert cream.

To do this, a mixture is prepared comprising 5.7 parts milk proteins, 15.5 parts vegetable fats, 0.2 part xanthan gum, 1.1 parts vanilla essence, 12 parts semolina sugar and 37.5 parts rice flour, dried beforehand on a cylinder.

7 parts of each of the flavoring bases obtained in Examples 3, 4, 5 and 6 are added to this mixture.

A powdered food composition is thus obtained, which the consumer can reconstitute by mixing, while cold, 25% of the said composition with 75% whole milk, so as to obtain a creamy, vanilla-flavored dessert.

What is claimed is:

1. A method for preparing a flavoring base, which comprises:
   preparing a mixture comprising at least water and a starchy starting material comprising wheat semolina or flour;
   liquefying the mixture with at least one carbohydrase; and
   enzymatically treating the liquefied mixture with a lipase or a lipoxygenase to form the flavoring base.

2. A method for preparing a flavoring base, which comprises:
   preparing a mixture comprising 50–70% water, 25–50% of a starchy starting material, and 0–5% vegetable oil;
   liquefying the mixture with at least one carbohydrase; and
   enzymatically treating the liquefied mixture with a lipase or a lipoxygenase to form the flavoring base.

3. A method for preparing a flavoring base which comprises:
   preparing a mixture comprising at least water and a starchy starting material;
   liquefying the mixture with 0.2–0.5% α-amylase at 50°–85° C. for 70–90 minutes; and
   enzymatically treating the liquefied mixture with a lipase or a lipoxygenase to form the flavoring base.

4. A method for preparing a flavoring base, which comprises:
   preparing a mixture comprising at least water and a starchy starting material;
   liquefying the mixture with at least one carbohydrase; and
   enzymatically treating the liquefied mixture with 0.5–1.5% lipoxygenase at 40°–60° C. for 80–100 minutes to form the flavoring base.

5. A method for preparing a flavoring base, which comprises:
   preparing a mixture comprising at least water and a starchy starting material;
   liquefying the mixture with at least one carbohydrase; and
   enzymatically treating the liquefied mixture with 0.05–0.2% lipase at 45°–65° C. for 110–130 minutes to form the flavoring base.

6. The method according to one of claims 1–5, in which the mixture is dried after the enzymatic treatment step.

7. The method according to one of claims 1–5, in which the mixture is heat-treated at 90°–120° C. for 10–30 minutes after the enzymatic treatment step.

8. The method according to one of claims 1–5, which further comprises adding the flavoring base to a food product.

9. A method, for preparing a flavoring base, which comprises:
   preparing a mixture comprising at least water and a starchy starting material;
   liquefying the mixture with at least one carbohydrase;
   enzymatically treating the liquefied mixture with a lipase or a lipoxygenase to form the flavoring base;
   incorporating the flavoring base into a composition comprising 8–15% water and, as % solids by weight, 70–90% starchy starting material, 2–20% sugar, 1–5% hydrogenated palm oil, 2–4% malt extract, 2–3% salt and 0–1% calcium carbonate; and then
   subjecting the resultant composition to extrusion-cooking to impart a desired taste to the composition.

10. The method of claim 9 which further comprises drying the flavoring base before incorporating the dried flavoring base into the composition, wherein the dried flavoring base is added at a proportion of 10–80% dried base per 20–90% composition.

11. The method of claim 9 which further comprises incorporating the flavoring base in liquid form into the composition at a proportion of 5–25% liquid base per 75–95% composition.

12. The method of claim 9 which further comprises conducting the extrusion-cooking at a temperature of 150°–190° C. for 20–60 seconds.

13. The method according to claim 1 wherein the starchy starting material is present in the mixture in an amount of 25 to 50%.

* * * * *